United States Patent [19]

Opitz et al.

[11] Patent Number: 4,581,036

[45] Date of Patent: Apr. 8, 1986

[54] PROCESS FOR PREPARING LIQUID LOW-SALT AQUEOUS REACTIVE DYESTUFF COMPOSITIONS

[75] Inventors: Konrad Opitz, Liederbach; Heinrich Pohlmann, Kelkheim; Manfred Sittig, Kriftel; Christian Fabel, Kelkheim; Siegfried Wilhelm, Frankfurt am Main; Franz Mitter, Kriftel, all of Fed. Rep. of Germany

[73] Assignee: Hoechst Aktiengesellschaft, Fed. Rep. of Germany

[21] Appl. No.: 719,744

[22] Filed: Apr. 4, 1985

[30] Foreign Application Priority Data

Jul. 21, 1984 [DE] Fed. Rep. of Germany ....... 3426931

[51] Int. Cl.$^4$ .................... C09B 67/00; C09B 62/00
[52] U.S. Cl. ........................................ 8/527; 8/549;
8/641; 8/673; 8/681; 8/682; 8/686; 8/687;
8/690; 8/692; 8/696
[58] Field of Search .................................. 8/527, 549

[56] References Cited

U.S. PATENT DOCUMENTS

| 4,072,463 | 2/1978 | Schlafer et al. | 8/527 |
| 4,078,884 | 3/1978 | Opitz et al. | 8/527 |
| 4,149,850 | 4/1979 | Schlafer et al. | 8/549 |
| 4,315,865 | 2/1982 | Hoyer et al. | 534/793 |
| 4,443,224 | 4/1984 | Opitz et al. | 8/549 |

FOREIGN PATENT DOCUMENTS

| 1060063 | 2/1967 | United Kingdom . |
| 1359898 | 7/1974 | United Kingdom . |
| 2079771 | 1/1982 | United Kingdom . |

Primary Examiner—A. Lionel Clingman
Attorney, Agent, or Firm—Connolly and Hutz

[57] ABSTRACT

A process is described for separating sodium sulfate from aqueous solutions of certain fiber-reactive dyestuffs, which contain less than 2% by weight of chloride, by cooling down said solution to a temperature between +5° C. and −15° C. In the course of the cooling, the sodium sulfate precipitates in the form of the decahydrate and can be separated off in conventional manner, for example by filtration. The results obtained in this way are aqueous liquid low-salt preparations of these dyestuffs which contain less than 4% by weight of sodium sulfate.

13 Claims, No Drawings

PROCESS FOR PREPARING LIQUID LOW-SALT AQUEOUS REACTIVE DYESTUFF COMPOSITIONS

The dyeing and printing of nitrogen-containing fiber materials, such as wool, silk or synthetic polyamide fibers, and especially of fiber materials in natural or regenerated cellulose and of blend fabrics containing these fibers is widely effected with reactive dyestuffs which are used in the form of dry powders containing noncoloring standardizing agents. In addition to the fact that, owing to the powder form, these dyestuff powders give rise to unpleasant dusting, they are difficult to mix up into print pastes and padding or dyeing liquors especially for the reason that, owing to the fact that they contain dedusting agents on mineral oil bases, which can lead to oily deposits, many dyestuff powders have poor wetting properties and as a result tend to form lumps or are insufficiently soluble.

These disadvantages of dyestuff powders are noticeable in particularly unpleasant fashion in the case of those dyeing methods where it is necessary to attain high dyestuff concentrations at low temperatures, as, for example, in the case of the short-time pad-batch method. In this area, dyestuffs are preferably in the form of liquid preparations, which are markedly superior to pulverulent preparations. In the case of less than readily water-soluble reactive dyestuffs, marketable liquid preparations are obtained by using solubilizers or combinations of solubilizers with anionic dispersants (see for example British Pat. No. 1,060,063, German Offenlegungsschrift 2,529,658 and U.S. Pat. No. 4,443,224). Of practical interest, however, are in particular liquid dyeing preparations where water is the sole solvent and dyestuff contents are high; yet these can only be prepared with readily water-soluble reactive dyestuffs. Preparations of this type are known for example from U.S. Pat. Nos. 4,072,463, 4,078,884 and 4,149,850. High salt contents, however, are undesirable, since they can lower the solubility of the dyestuff or, in the case of sulfate salts, precipitates of sodium sulfate decahydrate can appear at low storage temperatures and not disappear again quickly enough by the reverse process at room temperature.

There are then a number of reactive dyestuffs which, in pure, low-salt form, are sufficiently water-soluble, which, owing to an excessively high synthesis-derived salt content, either cannot be processed into marketable liquid pure aqueous preparations at all or, if they can be processed into liquid pure aqueous preparations at room temperature or elevated temperature, are not stable in that form to cold storage.

Attempts have consequently been made to reduce the undesirable high salt contents. However, such methods as are described in the literature are associated with appreciable disadvantages. For instance, excess sulfuric acid from sulfonations, sulfatizations (esterification) and diazotizations is neutralized with calcium carbonate and separated off in the form of sparingly soluble calcium sulfate (gypsum). These disadvantages are that the gypsum residue needs to be dumped after and be washed carefully beforehand to avoid, inter alia, dyestuff losses; said wash results in a very dilute dyestuff solution, the concentration or drying of which requires a correspondingly high amount of energy.

A fundamentally different method of removing unwanted and interfering salts underlies, for example, the membrane separation processes described in British Pat. No. 1,359,898 or in German Offenlegungsschrift 2,948,292. These processes likewise have appreciable disadvantages. Additional costly apparatus is necessary, and in practice it is only possible to remove chlorides, while sulfates cannot be practically separated from reactive dyestuffs by membrane separation processes since the molecular weight ratio of 1:10 between sulfate anion and dyestuff anion, which is required for a successful separation of salt and dyestuff, is not reached by a long way, in particular since the molecular weight of the sulfate ion in this ratio is effectively the molecular weight of the hydrated sulfate ion, so that, on the assumption that its hydrate envelope contains only 5 molecules of $H_2O$, only dyestuffs having a molecular weight greater than 2,000 could be separated from sulfate ions by membrane separation processes. However, the molecular weights of most reactive dyestuffs are within the range between 300 and 1,000 and are higher only in exceptional cases. If, nevertheless, membranes which are permeable to sulfate ions are used, it is necessary to accept high dyestuff losses. A further disadvantage of membrane separation processes is the salt-containing waste water which inevitably results.

For instance, British Patent Application publication 2,079,771 discloses a process for separating sodium sulfate from solutions of acid dyestuffs of the azo series, wherein the sodium sulfate is separated off by addition of water-miscible organic compounds which generally serve as solvent. Monoethylene glycol, its methyl and ethyl ethers, and ethanolamines are mentioned as such compounds. These "solvents", however, in addition to lowering the solubility of the sodium sulfate, can also lower the solubility of the dyestuffs, which is of course undesirable; certainly, they cannot be used for fiber-reactive dyestuffs, since they react with the fiber-reactive groups when the fiber-reactive dyestuffs are applied to and fixed on the fiber, if not before, thereby reducing the color yield.

It is thus the object of the present invention, through avoidance of the disadvantages of previously disclosed processes for removing electrolyte salts, such as in particular sodium sulfate, to find a way of processing fiber-reactive dyestuffs into aqueous solutions which have a very high concentration of dyestuff and are substantially free of electrolyte salts, such as alkali metal chlorides, in particular alkali metal sulfates, and are also very suitable for use as liquid dyeing preparations having a long shelf life.

This object is achieved with the present invention. The present invention accordingly provides an ecologically safe and economical process for preparing liquid low-sulfate aqueous dyeing preparations (compositions) of reactive dyestuffs of the general formula (1) which is shown below and defined hereinafter

$$(MO_3S)_m\!+\!F\!-\!(Z)_n\!+\!(OSO_3M)_k \qquad (1)$$

where no additional costly apparatus is required and wherein the sulfate which has been separated off does not appear disadvantageously as a waste material. The process according to the invention comprises cooling an aqueous solution of one or more reactive dyestuffs of the general formula (1), which contains sodium sulfate and less than 2% by weight, preferably less than 1% by weight, of chloride (calculated as chloride ions) to a temperature between +5° C. and −15° C., preferably between +3° C. and −10° C., and separating off the precipitated sodium sulfate decahydrate (Glauber salt), for example by filtration or centrifugation.

In the formula (1)

F is the radical of a dyestuff chromophor of an anthraquinone dyestuff, of a monoazo dyestuff, of a disazo dyestuff, of a trisazo dyestuff or of a phthalocyanine dyestuff, or of a copper, chromium, cobalt, nickel or iron complex dyestuff of a monoazo, disazo or trisazo dyestuff or phthalocyanine dyestuff, M is a hydrogen atom or preferably an alkali metal, such as sodium, potassium or lithium, in particular preferably sodium, k is zero, 1, 2, 3 or 4, preferably 1, 2 or 3, and m is zero, 1, 2, 3 or 4, preferably 2, 3 or 4, the sum of (k+m) being a numbwr of at least 1, preferably at least 2, n is 1, 2, or 3, Z is a fiber-reactive monochlorotriazine radical, preferably of the general formula (2a) which is shown below and defined hereafter

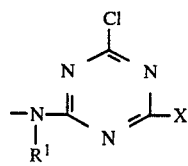

or a fiber-reactive group of the formula (2b), (2c), (2d) or (2e)

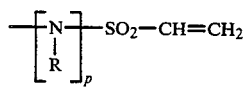

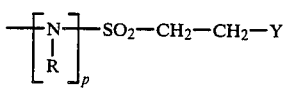

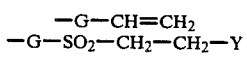

in which G is a methylene or ethylene group,

R is an alkyl group of 1 to 4 carbon atoms, such as an ethyl group and in particular methyl group, p stands for the number zero or 1 and Y is an acetyloxy group, a phosphato group (of the general formula —OPO$_3$M$_2$ with M having the abovementioned meaning), a thiosulfato group (of the general formula —S—SO$_3$M with M having the abovementioned meaning) or a sulfato group (of the general formula —OSO$_3$M with M having the abovementioned meaning) or a chlorine or bromine atom, the fiber-reactive groups Z, insofar as in accordance with n being equal to 2 or 3 they are bonded to F twice or three times, can have meanings which are identical to or different from one another, the indicated sulfo groups cannot only be bonded to aromatic and aliphatic carbon atoms of F but can also be part of the fiber-reactive monochlorotriazine radical, such as that of the general formula (2a), the indicated sulfato groups cannot only be bonded to aliphatic carbon atoms of F but can also be part of the fiber-reactive group of the formula (2c) or (2e) and/or of the fiber-reactive monochlorotriazine radical, such as that of the general formula (2a).

In the abovementioned general formula (2a),

R$^1$ is a hydrogen atom or an alkyl group of 1 to 4 carbon atoms, such as a methyl or ethyl group, X is a group of the general formula (3a), (3b) or (3c)

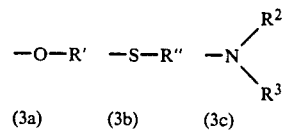

in which

R' is a hydrogen atom or an alkyl group of 1 to 4 carbon atoms or denotes an alkyl group of 1 to 4 carbon atoms which is substituted by an alkoxy group of 1 to 4 carbon atoms, by a sulfo, carboxy, sulfato or phosphato group or by a phenyl group which is unsubstituted or substituted by 1 or 2 substituents from the group consisting of methyl, ethyl, methoxy, ethoxy, chlorine, sulfo and carboxy, R" is an alkyl group of 1 to 4 carbon atoms or denotes an alkyl group of 1 to 4 carbon atoms which is substituted by an alkoxy group of 1 to 4 carbon atoms, by a sulfo, carboxy, sulfato or phosphato group or by a phenyl group which is unsubstituted or substituted by 1 or 2 substituents from the group consisting of methyl, ethyl, methoxy, ethoxy, chlorine, sulfo and carboxy, R$^2$ is a hydrogen atom or an alkyl group of 1 to 4 carbon atoms which can be substituted by one or two substituents from the group consisting of acetylamino, hydroxy, sulfato, β-sulfatoethylsulfonyl, β-thiosulfatoethylsulfonyl, alkoxy of 1 to 4 carbon atoms, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl, or is a cycloalkyl radical of 5 to 8 carbon atoms which can be substituted by 1, 2 or 3 methyl groups and/or by an amino or alkylamino group having an alkyl radical of 1 to 4 carbon atoms, and R$^3$ is a hydrogen atom or an alkyl group of 1 to 4 carbon atoms which can be substituted by one or two substituents from the group consisting of acetylamino, hydroxy, sulfato, β-sulfatoethylsulfonyl, β-thiosulfatoethylsulfonyl, alkoxy of 1 to 4 carbon atoms, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl, or is a phenyl or naphthyl group or denotes a phenyl group which is substituted by 1 or 2 substituents from the group consisting of acetylamino, benzoylamino, nitro, β-sulfatoethylsulfonyl, β-thiosulfatoethylsulfonyl, β-chloroethylsulfonyl, vinylsulfonyl, alkoxy of 1 to 4 carbon atoms, sulfo, carboxy, sulfmoyl and carbamoyl, or is a naphthyl group which is substituted by 1, 2 or 3, sulfo groups or by 1 or 2 sulfo groups and a vinylsulfonyl, β-sulfatoethylsulfonyl, β-thiosulfatoethylsulfonyl or β-chloroethylsulfonyl group, where $R^2$ and $R^3$ can possess meanings which are identical to or different from each other, or in which $R^2$ and $R^3$, together with the nitrogen atom, form the radical of a 5- to 8-membered heterocyclic ring which is composed of 1, 2 or 3 alkylene radicals of 1 to 5 carbon atoms and, if desired, one or two heteroatoms, such as an oxygen, nitrogen or sulfur atom, such as, for example, a piperazino, piperidino or morpholino ring.

Preferably, $R'$, $R''$, $R^2$ and $R^3$, identical or different from one another, are each an alkyl group of 1 to 4 carbon atoms which can be substituted by a hydroxy, acetyloxy or sulfato group, or a phenyl radical which can be substituted by 1 or 2 substituents from the group consisting of β-sulfatoethylsulfonyl, sulfo and carboxy.

Preferred dyestuffs from the series of dyestuffs of the general formula (1) have the general formulae (1a), (1b), (1c), (1d), (1e) and (1f)

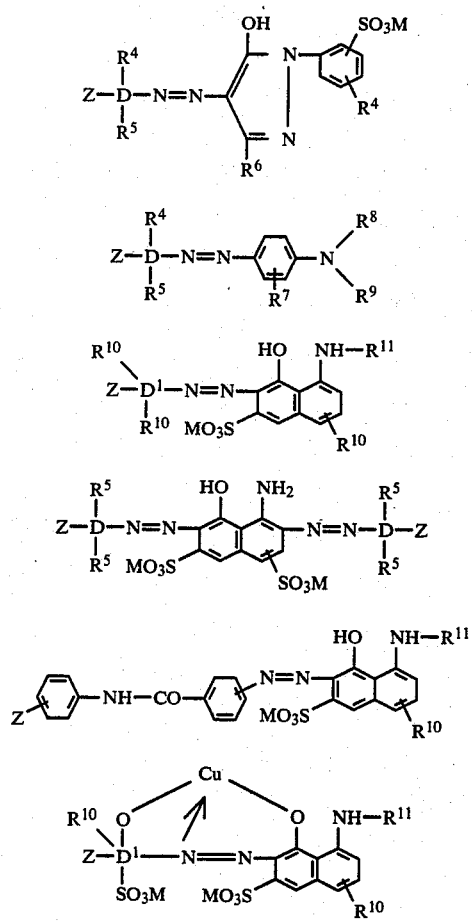

in which

Z has the abovementioned meaning and is in particular a fiber-reactive group of the general formula (2b) in which p stands for the number zero, and is particularly preferably a group of the general formula (2c) in which p stands for the number zero and in which Y has the abovementioned meaning, being in particular preferably a sulfato group, M has the abovementioned meaning, D is a benzene ring, $R^4$ is a hydrogen atom or an alkyl group of 1 to 4 carbon atoms, such as in particular a methyl group, or an alkoxy group of 1 to 4 carbon atoms, such as an ethoxy and in particular a methoxy group, a chlorine atom, a sulfo group (of the general formula $-SO_3M$ with M hving the abovementioned meaning) or a carboxy group (of the general formula $-COOM$ with M having the abovementioned meaning), $R^5$ is a hydrogen atom or an alkyl group of 1 to 4 carbon atoms, such as in particular a methyl group, or an alkoxy group of 1 to 4 carbon atoms, $R^6$ is a carbalkoxy group of 2 to 5 carbon atoms, such as a carbomethoxy or carboethoxy group, or preferably a methyl or carboxy group, $R^7$ is a chlorine atom, a methyl group, an acetylamino group or a ureido group, $R^8$ is a hydrogen atom or an alkyl group of 1 to 4 carbon atoms, preferably thereamong an ethyl group, which can be substituted by a sulfato, sulfo, carboxyl, monosulfophenyl or disulfophenyl group, $R^9$ is an alkyl group of 1 to 4 carbon atoms, preferably thereamong an ethyl group, which is substituted by a sulfato, sulfo, carboxy, monosulfophenyl or disulfophenyl group, $D^1$ is a napthalene ring, $R^{10}$ is a hydrogen atom or a sulfo group, $R^{11}$ is an acetyl group or a benzoyl group, $R^{12}$ is a hydrogen atom, a chlorine atom or a methyl, methoxy or ethoxy group;

the moieties of identical designation which are in the formulae can have meanings which are identical to or different from one another, and the individual moieties can similarly have meanings which are identical or different from one another.

The process according to the invention makes it possible to use aqueous solutions of dyestuffs of the general formula (1) to prepare low-sulfate concentrated aqueous solutions of the abovementioned reactive dyestuffs of the general formula (1), having a sodium sulfate ($Na_2SO_4$) content of less than 5% by weight, preferably less than 4% by weight and in particular of at most 3% by weight.

The starting solutions of fiber-reactive dyestuffs of the general formula (1) which contain sodium sulfate and which are to be freed of substantial portions of said sodium sulfate in the process according to the invention and in the course of said process are concentrated owing to the inclusion of water of crystallization in the sodium sulfate (Glauber's salt), are the conventionally obtainable synthesis solutions of these dyestuffs. In the synthesis, the acid used in the individual reaction steps, in particular in the diazotization reaction, is preferably sulfuric acid, to avoid introducing chloride ions into the system. This is because an elevated chloride ion content of above 2% by weight makes it difficult to separate off the sodium sulfate decahydrate: it prevents the ready crystallization of the Glauber salt. The starting solutions can also be synthesis solutions which initially had a relatively high chloride content and from which the chloride has been removed beforehand, for example by one of the abovementioned membrane separation processes, until the chloride content is less than 1% by weight.

The starting solutions (synthesis solutions) generally have a pH between 3 and 7 and can contain buffer substances, such as, for example, sodium dihydrogen phosphate, disodium hydrogen phosphate, sodium oxalate, sodium acetate or sodium borate, which are able to establish and maintain a pH of 3 to 7, plus other auxiliaries, for example defoamers, and/or extremely low amounts of inert substances carried over from the synthesis.

To the low-sulfate solutions with fiber-reactive dyestuffs of the general formula (1), obtainable according to the invention, can also be added the buffer substances, which are able to establish and maintain a pH of 3 to 7, added subsequently, which is preferable, furthermore the preservatives customary for concentrated liquid preparations of other auxiliaries, such as anionic or non-ionic wetting agents, dyeing auxiliaries and if desired low amounts of dispersants.

The aqueous dyestuff solutions of low sodium sulfate content, of general formula (1), obtainable by the process according to the invention tion can be used in dyeing directly as liquid preparations, if desired after addition of the abovementioned buffer substances and other auxiliaries. Since, as a consequenceofthe method of preparation, the sulfate content of these concentrated dyestuff solutions is at low temperatures stillatthe upper limit of sulfate solubility at around 0° C., these solutions which at 0° C. have a concentrated or almost saturated sodium sulfate concentration are advantageously subsequently rediluted with water to a certain extent in order to prevent sodium sulfate decahydrate from crystallizing out when these concentrated solutions obtainable by the process are stored at very low, such as winterly, temperatures. This is because the crystallization of Glauber salt in commercial liquid preparations leads to disadvantages in use, since the sodium sulfate decahydrate dissolves fast enough only if the preparation is heated to above the melting point of the decahydrate.

The present invention thus provides not only aqueous dyestuff solutions of one or more dyestuffs of the general formula (1) which have a total dyestuff content of 5 to 45% by weight and an $Na_2SO_4$ content of less than 5% by weight and preferably less than 4% by weight and which are obtainable by the process according to the invention, but also in particular, obtainable therefrom, advantageous liquid dye preparations (compositions) which contain 5 to 40% by weight of dyestuff of the general formula (1), less than 4%, preferably at most 3%, by weight of $Na_2SO_4$, 2% by weight or less than 2% by weight and preferably less than 1% by weight of chloride ions and, if desired, one or more buffer substances of in total up to 3% by weight and have a pH between 3 and 7.

The liquid low-salt aqueous dyestuff preparations of fiber-reactive dyestuffs of the general formula (1) according to the invention are highly stable to storage and even after storage for a number of weeks at room temperature or at temperatures of up to 50° C. or at low temperatures, such as temperatures of +5° C. to −5° C., lead to no precipitations whatsoever, provided that, in the preparations obtainable by the process, the low sodium sulfate content does not reach the solubility limit at the lower temperatures; in particular, the solubility of the dyestuff remains unaffected by prolonged storage, as do the hue and also the reactivity of the dyestuff with the fiber, so that there is no loss of dyeing strength. For that reason, as already mentioned, the liquid preparations according to the invention can be used directly for preparing dyeing liquors and print pastes which can be used for dyeing the materials customarily dyeable with these dyestuffs, such as in particular carboxamido- and/or hydroxy-groups containing fiber materials.

Sodium sulfate decahydrate separated off by the process according to the invention can be advantageously employed further with still adherent mother liquor, i.e. without the prior wash, namely in the preparation of dyestuff powders of dyestuff of the general formula (1) by adding it to another synthesis solution of this dyestuff which is processed into a powder by drying, for example spray-drying. These dyestuffs are thus obtained in the form of powder formulations having a higher sodium sulfate content. These compositions can be desirable in dyeing and help to reduce the amount of sodium sulfate which is additionally added by the dyer to the dyebath or even eliminate it completely. On the contrary, the process according to the invention makes it possible to obtain low-salt concentrated dyestuff solutions of these dyestuffs, which offer advantages to the dyer and user, since the need for weighing out pulverulent substances and dissolving and making them up into dyebaths is dispensed with, and with which it is possible to make up the dyebath or print paste rapidly and conveniently, as a rule by diluting with water or an aqueous thickening which can already contain appropriate dye auxiliaries. More particularly, in the case of cold-dyeing methods, the otherwise necessary hot-dissolving of the pulverulent dyestuff, followed by a cooling period for the solution, is avoided.

The following Examples serve to illustrate the invention. The parts and percentages therein are by weight, unless otherwise stated.

EXAMPLE 1

(a) The known compound of the formula (4)

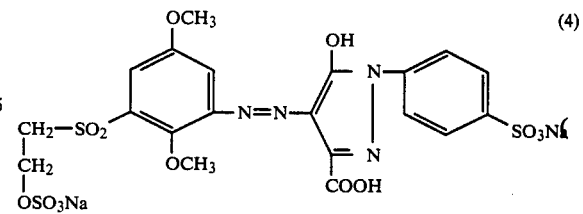

is prepared in conventional manner by coupling diazotized 2,5-dimethoxy-4-(β-sulfatoethylsulfonyl)-aniline on to 1-(4-sulfophenyl)-3-carboxypyrazol-5-one. The result is an aqueous dyestuff solution which contains for example 15.3% of this dyestuff, 5.1% of sodium sulfate and 0.6% of sodium chloride.

1,000 parts of such a solution were cooled down with occasional stirring to a temperature of 0° C. and were maintained with occasional stirring at said temperature for 6 hours. 60 parts of sodium sulfate decahydrate came down as precipitate and were filtered off (it can be added, together with the adherent mother liquor, i.e. without subsequent washing, can be added to another batch of this dye, which is to be processed into a solid dyestuff powder by drying, such as spray-drying).

The 940 parts of filtrate obtained contained 16.3% of the dyestuff of the formula (4), 0.64% of sodium chloride and 2.6% of sodium sulfate ($Na_2SO_4$) and had a pH of 5.3. This liquid preparation, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with such an amount of water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 940 parts of the filtrate, obtained according to the invention in (a), can be added 15 parts of sodium dihydrogenphosphate in 65 parts of water to obtain in this way 1,020 parts of a liquid dyeing preparation which contains 15% of the dyestuff of the formula (4), 2.4% of sodium sulfate ($Na_2SO_4$) and less than 0.6% of sodium chloride and has a pH of 4.7.

This liquid preparation, stored in a sealed vessel, is stable to storage at 20° C. of at least 6 months and at 50° C. of at least 6 weeks without precipitation of sodium sulfate or dyestuff and without less of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce orange dyeings and prints which were just as strong as those prepared with 1 part of a powder formulation which contains 45% of the dyestuff of the formula (4) and was employed in the same manner as above in equal-concentration dyebaths, padded liquors or print pastes.

(d) If, on the other hand, the 1,000 parts of the starting dyestuff solution used above in (a) are directly standardized to 15% of dyestuff of the formula (4) with 20 parts of sodium dihydrogenphosphate, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 2

(a) An aqueous synthesis solution of a conventionally prepared dyestuff of the formula (5)

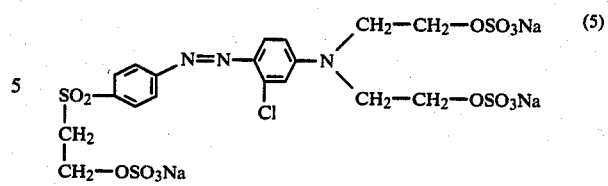

which contained 10.33% of this dyestuff, 0.14% of sodium chloride and 16.3% of sodium sulfate, was subjected to the process according to the invention, to remove sodium sulfate. For this purpose, 1,420 parts of this synthesis solution were cooled down with slow-speed stirring to 0° C.; the temperature was maintained with further stirring for 8 hours. Thereafter the precipitated sodium sulfate decahydrate (498 parts) was filtered off (the precipitated decahydrate, as in the preceding Example and also the following Examples, can be added without further washing to another batch of the respective dyestuff which is intended for further processing into a solid dyestuff powder, for example by drying, such as spray-drying).

The filtrate obtained was 922 parts of a solution which contained 15.9% of dyestuff of the formula (5), 0.22% of sodium chloride and 1.24% of sodium sulfate and had a pH of 6.0. This liquid composition, stored in a sealed vessel, is stable to storage at 5°–20° C. of at least 6 months and at 40° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable composition in this respect, the solution obtained according to the invention can be diluted with water (for example with such an amount of water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 922 parts of the filtrate, obtained according to the invention in (a), can be added 7 parts of sodium dihydrogenphosphate and 7 parts of disodium hydrogenphosphate in 10 parts of water to obtain in this way 946 parts of a liquid dyeing preparation which contains 15.5% of the dyestuff of the formula (5), 1.2% of sodium sulfate ($Na_2SO_4$) and less than 0.22% of sodium chloride and has a pH of 6.2.

This liquid preparation, stored in a sealed vessel, stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce golden yellow dyeings and prints which were just as strong as those prepared with 1 parts of a powder formulation which contains 62% of the dyestuff of the formula (5) and was employed in the same manner as above in equal-concentration dyebaths, padded liquors or print pastes.

(d) If, on the other hand, the 1,420 parts of the starting dyestuff solution used above in (a) are directly standardized to 10% of dyestuff of the formula (5) with 11 parts of sodium dihydrogenphosphate and 11 parts of disodium hydrogenphosphate in 25 parts of water, this appreciably weaker preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 3

(a) 1,000 parts of an aqueous solution of the dyestuff of the formula (6)

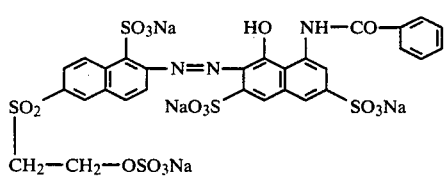

which was obtained in the course of a conventional procedure for synthesizing this dyestuff and contained 15.8% of this dyestuff, 4.6% of sodium sulfate and 2.1% of sodium chloride, were cooled down with occasional stirring to −3° C.; this temperature was maintained while occasionally stirring the solution. 80 parts of sodium sulfate decahydrate precipitated and were filtered off.

The resulting filtrate (920 parts) contained 17.2% of the dyestuff of the formula (6) 2.3% of sodium chloride and 1.2% of sodium sulfate and had a pH of 5.9. This liquid preparation, stored in a sealed vessel, is stable to storage at 5°–20° C. of at least 6 months and at 50° C. of at least 6 weeks without precipitations. On addition of a buffer substance to stabilize the pH of between 3 and 7, moreover, there was not loss of dyeing strength, nor were there any hue changes in dyeings prepared with this preparation after different periods of storage. However, on cooling down the preparation to below −3° C., the existing saturation in sodium sulfate causes formation of Glauber salt crystals.

(b) To obtain a satisfactory marketable composition in this respect, the solution obtained according to the invention can be diluted with water (for example with such an amount of water as to produce a solution standardized in respect of other commercial dyestuffs), so that the result is a liquid preparation which is extremely low in sodium sulfate but still contains a sufficient concentration of dyestuff and which is still sufficiently stable to storage even at temperatures of 0° C. or a little below and does not lead to precipitations of sodiium sulfate decahydrate.

For instance, to 920 parts of the filtrate obtained according to the invention in (a), are added 20 parts of sodium dihydrogenphosphate in 182 parts of water to obtain in this way 1,122 parts of a liquid dyeing preparation which contains 14.1% of the dyestuff of the formula (6), 0.98% of sodium sulfate (Na$_2$SO$_4$) and less than 2% of sodium chloride and has a pH of 4.8.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produced red dyeings and prints which were just as strong as those prepared with 1 part of a powder formulation which contains 56.4% of the dyestuff of the formula (6) and was employed in the same manner as above in equal-concentration dyebaths, padded liquors or print pastes.

(d) If, on the other hand, the 1,000 parts of the starting dyestuff solution used above in (a) are directly standardized to 14.1% of dyestuff of the formula (6) with 20 parts of sodium dihydrogenphosphate in 102 parts of water, this preparation, if stored at 0° C., give rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 4

(a) 1,136 parts of an aqueous solution of the dyestuff of the formula (7)

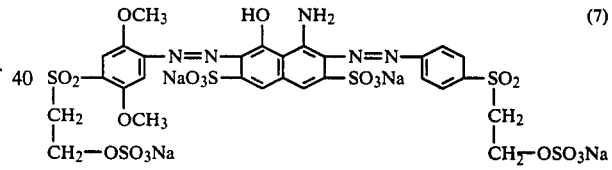

which was obtained in a conventional synthesis of this disazo dyestuff and contained 17.6% of this dyestuff, 7% of sodium sulfate and 0.36% of sodium chloride, was cooled down with slow-speed stirring to −2° C. and was slowly stirred at this temperature for a further 7 hours. The precipitated sodium sulfate decahydrate (136 parts) was filtered off.

The 1,000 parts of resulting filtrate contained 20.0% of the dyestuff of the formula (7), 0.41% of sodium chloride and 1.92% of sodium sulfate (Na$_2$SO$_4$) and had a pH of 5.5. This liquid preparation, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below −2° C., the existing saturation in sodium sulfate causes formation of Glauber salt crystals.

(b) To obtain a satisfactory marketable preparation in this respect, the solution obtained according to the invention can be diluted with water (for example with such an amount of water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 1,000 parts of the filtrate, obtained according to the invention in (a), can be added 25 parts of sodium dihydrogenphosphate in 429 parts of water to obtain in this way 1,454 parts of a liquid dyeing preparation which contains 13.75% of the dyestuff of the formula (7), 1.32% of sodium sulfate (Na₂SO₄) and less than 0.3% of sodium chloride and has a pH of 4.7.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce navy dyeings and prints which were just as strong as those prepared with 1 part of a powder formulation which contains 55% of the dyestuff of the formula (7) and was employed in the same manner as above in equal-concentration dyebaths, padded liquors or print pastes.

(d) If, on the other hand, the 1,136 parts of the starting dyestuff solution used above in (a) are directly standardized to 13.75% of dyestuff of the formula (7) with 25 parts of sodium dihydrogenphosphate in 293 parts of water, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 5

(a) The dyestuff of the formula (8)

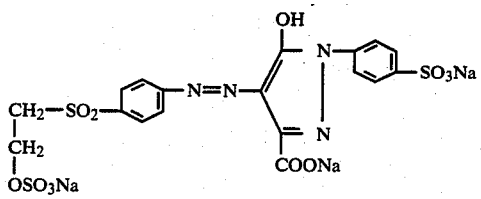

(8)

is prepared in conventional manner by coupling diazotized 4-(β-sulfatoethylsulfonyl)-aniline with 1-(4-sulfophenyl)-3-carboxy-5-pyrazol-5-one. The resulting aqueous synthesis solution contains 15.2% of this dyestuff, 6.3% of sodium sulfate and 0.55% of sodium chloride.

1,000 parts of this solution were cooled down with occasional stirring to 0° C. and were maintained at this temperature with occasional stirring for a further 8 hours. The precipitated 102 parts of sodium sulfate decahydrate were then filtered off.

The 898 parts of filtrate obtained contained 16.9% of the dyestuff of the formula (8), 0.61% of sodium chloride and 2% of sodium sulfate (Na₂SO₄) and had a pH of 5.3. This liquid preparation, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with amount of water as to produce a solution standarized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 898 parts of the filtrate, obtained according to the invention in (a), can be added 17 parts of sodium dihydrogenphosphate in 54 parts of water to obtain in this way 969 parts of a liquid dyeing preparation which contains 15.67% of the dyestuff of the formula (8), 1.85% of sodium sulfate (Na₂SO₄) and 0.57% of sodium chloride and has a pH of 4.7.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce yellow dyeings and prints which were just as strong as those prepared with 1 part of a powder formulation which contains 47% of the dyestuff of the formula (8) and was employed in the same manner as above in equal-concentration dyebaths, padded liquors or print pastes.

(d) If, on the other hand, the 1,000 parts of the starting dyestuff solution used above in (a) are directly standardized to 15.67% of dyestuff of the formula (8) with 17 parts of sodium dihydrogenphosphate and by removal of 48 parts of water, for example by distilling off under reduced pressure, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 6

(a) 1,000 parts of an aqueous solution of the known dyestuff of the formula (9)

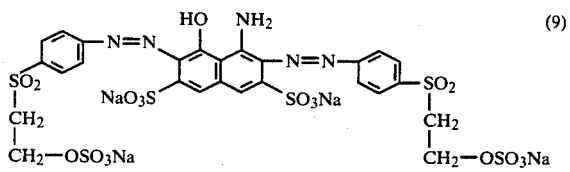

(9)

having a dyestuff content of 20.3%, a sodium sulfate content of 16.2% and a sodium chloride content of 0.4% are cooled down with slow stirring to −2° C. and are slowly stirred at said temperature for a further 8 hours. Precipitated sodium sulfate (306 parts) is filtered off.

The 694 parts of filtrate obtained contained 29.2% of the dyestuff of the formula (9), 0.58% of sodium chloride and 1.98% of sodium sulfate ($Na_2SO_4$) and had a pH of 4.7. This liquid composition, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable composition in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to store even at temperatures of 0° C. or a little below and does not lead to precipitations of sodium sulfate decahydrate.

For instance, to 694 parts of the filtrate, obtained according to the invention in (a), can be added with 10 parts of sodium dihydrogenphosphate in 20 parts of water to obtain in this way 724 parts of a liquid dyeing preparation which contains 28% of the dyestuff of the formula (9), 1.9% of sodium sulfate ($Na_2SO_4$) and less than 0.6% of sodium chloride and has a pH of 4.7.

This liquid composition, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 2 parts of the pH-stabilized solution named in (b) were used in each case to prepare in known and conventional manner dyebaths, padded liquors and print pastes which, applied to and fixed on cotton in the manner customary for reactive dyestuffs, produce navy dyeings and prints which were just as strong as those prepared with 1 part of a powder formulation which contains 56% of the dyestuff of the formula (9) and was employed in the same manner as above in equal-concentration dyebaths, padded liquors or print pastes.

(d) If, on the other hand, the 1,000 parts of the starting dyestuff solution used above in (a) are directly standardized to 28% of dyestuff of the formula (9) with 10 parts of sodium dihydrogen phosphate and by removal of 286 parts of water, for example by distilling off under reduced pressure, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 7

(a) By co-coupling two different diazo components and a coupling component in conventional manner it is possible to obtain an aqueous synthesis solution of two monoazo dyestuffs of the general formula

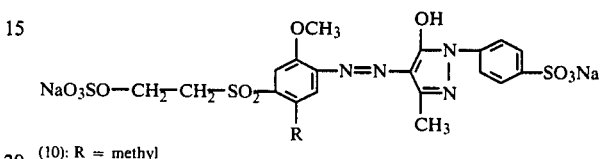

(10): R = methyl
(11): R = methoxy

These two monoazo dyestuffs are the known monoazo dyestuff (10) with R equal to the methyl group and the known monoazo dyestuff (11) with R equal to the methoxy group. An aqueous solution of these two dyestuffs can of course also be obtained by mixing the separately prepared individual dyestuffs or their synthesis solutions.

1,000 parts of an aqueous solution which contained 6% of dyestuff (10) and 10% of dyestuff (11) plus 0.67% of sodium chloride and 8.4% of sodium sulfate were cooled down with occasional stirring to a temperature of −2° C.; this temperature was maintained for a further 6 hours with occasional stirring of the solution. The precipitated sodium sulfate decahydrate (157 parts) was filtered off (it can be added together with the adhering mother liquor, i.e. without further washing, to another batch of this dyestuff which is to be processed into a solid dyestuff powder by drying, such as spray-drying).

The 843 parts of filtrate obtained contained 7.1% of dyestuff (10), 11.9% of dyestuff (11), 0.8% of sodium chloride and 1.8% of sodium sulfate ($Na_2SO_4$) and had a pH pH of 4.7. This liquid composition, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 843 parts of the filtrate, obtained according to the invention in (a), are added 15 parts of sodium dihydrogenphosphate in 142 parts of water to obtain in this way 1,000 parts of a liquid dyeing preparation which contains 6% of the dyestuff (10) and 10% of the dyestuff (11), 1.5% of sodium sulfate (Na₂SO₄) and less than 0.7% of sodium chloride and has a pH of 4.7.

This liquid composition, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce yellow dyeings and prints which were just as strong as those prepared with 1 part of a powder formulation which contains 24% of the dyestuff of the formula (10) and 40% of the dyestuff (11) and was employed in the same manner as above in equal-concentration dyebaths, padded liquors or print pastes.

(d) If, on the other hand, the 1,000 parts of the starting dyestuff solution used above in (a) are standardized to 5.9% of dyestuff (10) and 9.85% of dyestuff (11) with only 15 parts of sodium dihydrogenphosphate, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 8

(a) The known compound of the formula (12)

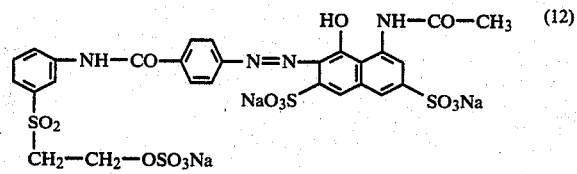

is obtained, for example, by coupling diazotized N-[3-(β-sulfatoethylsulfonyl)phenyl]-4-aminobenzamide on to 1-amino-8-naphthol-3,6-disulfonic acid acetylated in aqueous solution with acetic anhydride.

1,000 parts of an aqueous solution containing 14.1% of this dyestuff, 2.19% of sodium acetate, 4.5% of sodium sulfate and 0.5% of sodium chloride are cooled down with slow stirring to −2° C.; this temperature is maintained with further slow stirring for an additional 8 hours. Precipitated sodium sulfate decahydrate (61 parts) is filtered off.

The 939 parts of filtrate obtained contained 15% of the dyestuff of the formula (12), 2.33% of sodium acetat 0.53% of sodium chloride and 1.9% of sodium sulfate (Na₂SO₄) and had a pH of 4.6. This liquid preparation, stored in a sealed vessel, is stable to storage at 5°-20° C. of at least 6 months and at 50° C. of at least 6 weeks without precipitations. On account of the presence of buffer substance (sodium acetate) with pH-stabilizing action between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, the 939 parts of the filtrate, obtained according to the invention in (a), can be diluted with 99 parts of water to obtain in this way 1,038 parts of a liquid dyeing preparation which contains 13.6% of the dyestuff of the formula (12), 1.88% of sodium acetate, 1.7% of sodium sulfate (Na₂SO₄) and less than 0.5% of sodium chloride and has a pH of 4.5.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce red dyeings and prints which were just as strong as those prepared with 1 part of a powder formulation which contains 54.4% of the dyestuff of the formula (12) and was employed in the same manner as above in equal-concentration dyebaths, added liquors or print pastes.

(d) If, on the other hand, the 1,000 parts of the starting dyestuff solution used above in (a) are directly standardized to 13.6% of dyestuff of the formula (12) with 12 parts of sodium dihydrogenphosphate in 26 parts of water, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 9

(a) 1,000 parts of an aqueous solution of the known dyestuff of the formula (13)

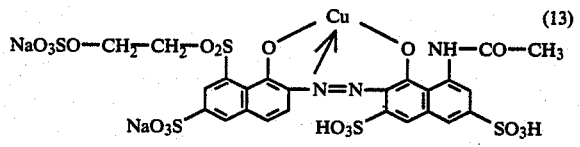

which contains, for example, 12.5% of this dyestuff, 2.1% o sodium acetate, 5.6% of sodium sulfate and 1.15% of sodium chloride were cooled down with slow stirring to −3° C.; this temperature was maintained with slow stirring for a further 6 hours. 107 parts of sodium sulfate decahydrate precipitated and were filtered off.

The 893 parts of filtrate obtained contained 14% of the dyestuff of the formula (13), 1.3% of sodium chloride, 2.3% of sodium acetate and 1% of sodium sulfate (Na$_2$SO$_4$) and had a pH of 4.8. This liquid preparation, stored in a sealed vessel, is stable to storage at 5°–20° C. of at least 6 months and at 50° C. of at least 6 weeks without precipitations. On account of the presence of buffer substance (sodium acetate) with pH-stabilizing action between 3 and 7, moreover, there was no loss of dyeing strength, nor were there any hue changes in dyeing prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, the 893 parts of the filtrate obtained according to the invention in (a), are diluted with 140 parts of water to obtain in this way 1,033 parts of a liquid dyeing preparation which contains 12.1% of the dyestuff of the formula (13), 2.0% of sodium acetate, 0.86% of sodium sulfate (Na$_2$SO$_4$) and 1.12% of sodium chloride and has a pH of 4.7.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce blue dyeings and prints which were just as strong as those prepared with 1 part of a powder formulation which contains 48.4% of the dyestuff of the formula (13) and was employed in the same manner as above in equal-concentration dyebaths, padded liquors or print pastes.

(d) If, on the other hand, the 1,000 parts of the starting dyestuff solution used above in (a) are directly standardized to 12.1% of dyestuff of the formula (13) with 18 parts of sodium dihydrogenphosphate in 15 parts of water, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 10

(a) 1,000 parts of an aqueous solution of the known dyestuff of the formula (14)

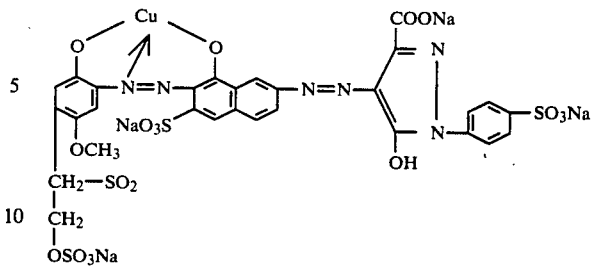

which contains, for example, 9.4% of this dyestuff, 11% of sodium sulfate and 0.6% of sodium chloride were cooled down with slow stirring to −2° C. and were maintained at said temperature with slow stirring for 8 hours. The precipitated sodium sulfate decahydrate (195 parts) was filtered off.

The 805 parts of filtrate obtained contained 11.67% of the dyestuff of the formula (14), 0.74% of sodium chloride and 3.0% of sodium sulfate (Na$_2$SO$_4$) and had a pH of 5.0. This liquid composition, stored in a sealed vessel, is stable to storage at 5°–20° C. of at least 6 months and at 50° C. of at least 6 weeks without precipitations. On addition of a buffer substance to stabilize the pH of between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, to 805 parts of the filtrate, obtained according to the invention in (a), can be added 19 parts of sodium dihydrogenphosphate in 116 parts of water to contain in this way 940 parts of a liquid dyeing preparation which contains 10% of the dyestuff of the formula (14), 2.6% of sodium sulfate (Na$_2$SO$_4$) and less than 0.9% of sodium chloride and has a pH of 4.5.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce black dyeings and prints which we just as strong as those prepared with 1 part of a powder formulation which contains 40% of the dyestuff of the formula (14) and was employed in the same manner as above in equal-concentration dyebaths, padded liquors or print pastes.

(d) If, on the other hand, the 1,000 parts of the starting dyestuff solution used above in (a) are directly standardized to 10% of dyestuff of the formula (14) with 19 parts of sodium dihydrogenphosphate and by removal of 79 parts of water, for example by distilling off under reduced pressure, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 11

(a) The method according to the invention is used to remove substantial portions of sodium sulfate from an aqueous solution of the dyestuff of the formula (15)

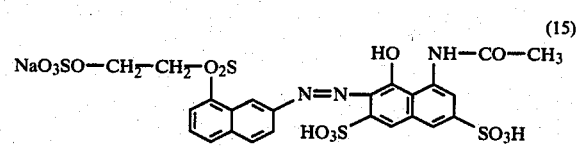
(15)

the solution being obtainable in conventional manner by coupling diazotized 8-(β-sulfatoethylsulfonyl)-2-aminonaphthalene on to 1-acetylamino-8-naphthol-3,6-disulfonic acid acetylated in aqueous solution with acetic anhydride. For this purpose, 1,000 parts of an aqueous solution containing 14.2% of this dyestuff, 2.7% of sodium acetate, 8.9% of sodium sulfate and 0.3% of sodium chloride were cooled down with occasional stirring, to 0° C.; the aqueous solution was maintained at said temperature with occasional stirring for a further 8 hours. The precipitated sodium sulfate decahydrate (150 parts) was filtered off.

The 850 parts of filtrate obtained contained 16.7% of the dyestuff of the formula (15), 3.17% of sodium acetate, 0.35% of sodium chloride and 2.7% of sodium sulfate ($Na_2SO_4$) and had a pH of 4.4. This liquid composition, stored in a sealed vessel, is stable to storage at 5°–20° C. of at least 6 months and at 50° C. of at least 6 weeks without precipitations. On account of the presence of buffer substance sodium acetate) with pH-stabilizing action between 3 and 7, moreover, there was no loss of dyeing strength, nor were there any hue changes in dyeings prepared with this preparation after different periods of storage. However, on cooling down the preparation to below 0° C., the existing saturation in sodium sulfate causes formation of Glauber salt crystals.

(b) To obtain a satisfactory marketable preparation in this respect, the solution obtained according to the invention can be diluted with water (for example with sufficient water as to produce a solution standardized in respect of other commercial dyestuffs), so that the result is a liquid preparation which contains less sodium sulfate but still a sufficient concentration of dyestuff and which is still sufficiently stable to storage even at temperatures of 0° C. or a little below and does not lead to precipitations of sodium sulfate decahydrate.

For instance, the 840 parts of the filtrate obtained according to the invention in (a) are diluted with 175 parts of water to obtain in this way 1,025 parts of a liquid dyeing preparation which contains 13.85% of the dyestuff of the formula (15), 2.63% of sodium acetate, 2.2% of sodium sulfate ($Na_2SO_4$) and less than 0.3% of sodium chloride and has a pH of 4.3.

This liquid preparation, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce red dyeings and prints which were just as strong as those prepared with 1 part of a powder formulation which contains 55.4% of the dyestuff of the formula (15) and was employed in the same manner as above in equal-concentration dyebaths, padded liquors or print pastes.

(d) If, on the other hand, the 1,000 parts of the starting dyestuff solution used above in (a) are directly standardized to 13.85% of dyestuff of the formula (15) with 25 parts of water, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

We claim:

1. A process for separating sodium sulfate from aqueous solutions, containing sodium sulfate and less than 2% by weight of chloride, of dyestuffs of the general formula (1)

$$(MO_3S)_m \text{—}F\text{—}(Z)_n\text{—}(OSO_3M)_k \qquad (1)$$

in which

F is the radical of a dyestuff chromophor of an anthraquinone dyestuff, of a monoazo dyestuff, of a disazo dyestuff, of a trisazo dyestuff or of a phthalocyanine dyestuff or of a copper, chromium, cobalt, nickel or iron complex dyestuff of a monoazo, disazo or trisazo dyestuff or phthalocyanine dyestuff, M is a hydrogen atom or preferably an alkali metal, k is zero, 1, 2, 3 or 4 and m is zero, 1, 2, 3 or 4 the sum of (k+m) being a number of at least 1, n is 1, 2 or 3,

Z is a fiber-reactive monochlorotriazine radical, or a fiber-reactive group of the formula

or

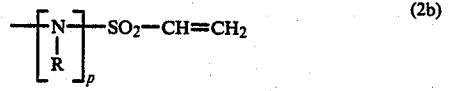

or

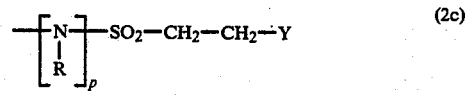

or

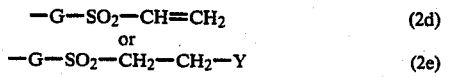

in which G is methylene or ethylene,

R is an alkyl group of 1 to 4 carbon atoms, p stands for the number zero or 1 and Y is an acetyloxy group, a phosphato group, a thiosulfato group or a sulfato group or a chlorine or bromine atom, and in which the fiber-reactive groups Z, insofar as in accordance with n being equal to 2 or 3 they are bonded to F twice or three times, can have meanings which are identical to or different from one another, the indicated sulfo groups need not only be bonded to aromatic and aliphatic carbon atoms of F but can also be part of the fiber-reactive monochlorotriazine radical, and the indicated sulfato groups need not only be bonded to aliphatic carbon atoms of F but can also be part of the fiber-reactive group of the formula (2c) or (2e) and or of the fiber-reactive monochlorotriazine radical, which comprises cooling down the solution to a temperature between +5° C. and −15° C. and separating off the precipitated sodium sulfate decahydrate.

2. The process as claimed in claim 1 wherein the radical Z or one of the radicals Z of formula (1) is a monochlorotriazine radical of the formula (2a)

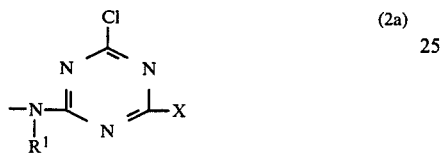

in which
R$^1$ denotes a hydrogen atom or an alkyl group of 1 to 4 carbon atoms,
X is a group of the general formula (3a), (3b) or (3c)

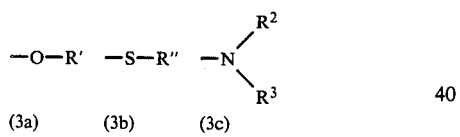

in which
R' is a hydrogen atom or an alkyl group of 1 to 4 carbon atoms or denotes an alkyl group of 1 to 4 carbon atoms which is substituted by an alkoxy group of 1 to 4 carbon atoms, by a sulfo, carboxy, sulfato or phosphato group or by a phenyl group which is unsubstituted or substituted by 1 or 2 substituents selected from the group consisting of methyl, ethyl, methoxy, ethoxy, chlorine, sulfo and carboxy,
R" is an alkyl group of 1 to 4 carbon atoms or denotes an alkyl group of 1 to 4 carbon atoms which is substituted by an alkoxy group of 1 to 4 carbon atoms, by a sulfo, carboxy, sulfato or phosphato group or by a phenyl group which is unsubstituted or substituted by 1 or 2 substituents selected from the group consisting of methyl, ethyl, methoxy, ethoxy, chlorine, sulfo and carboxy,
R$^2$ is a hydrogen atom or an alkyl group of 1 to 4 carbon atoms which can be substituted by one or two substituents selected from the group consisting of acetylamino, hydroxy, sulfato, β-sulfatoethylsulfonyl, β-thiosulfatoethylsulfonyl, alkoxy of 1 to 4 carbon atoms, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl, or is a cycloalkyl radical of 5 to 8 carbon atoms which can be substituted by 1, 2 or 3 methyl groups and/or by an amino or alkylamino group having an alkyl radical of 1 to 4 carbon atoms, and R$^3$ is a hydrogen atom or an alkyl group of 1 to 4 carbon atoms which can be substituted by one or two substituents selected from the group consisting of acetylamino, hydroxy, sulfato, β-sulfatoethylsulfonyl, β-thiosulfatoethylsulfonyl, alkoxy of 1 to 4 carbon atoms, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl, or is a phenyl or naphthyl group or denotes a phenyl group which is substituted by 1 or 2 substituents selected from the group consisting of acetylamino, benzoylamino, nitro, β-sulfatoethylsulfonyl, β-thiosulfatoethylsulfonyl, β-chloroethylsulfonyl, vinylsulfonyl, alkoxy of 1 to 4 carbon atoms, sulfo, carboxy, sulfamoyl and carbamoyl, or is a naphthyl group which is substituted by 1, 2 or 3 sulfo groups or by 1 or 2 sulfo groups and a vinylsulfonyl, β-sulfatoethylsulfonyl, β-thiosulfatoethylsulfonyl or β-chloroethylsulfonyl group,
where
R$^2$ and R$^3$ can possess meanings which are identical to or different from each other, or in which R$^2$ and R$^3$, together with the nitrogen atom and 1, 2 or 3 alkylene radicals of 1 to 5 carbon atoms and, optionally, one or two heteroatoms, such as an oxygen, nitrogen or sulfur atom, form a 5- to 8-membered heterocyclic ring.

3. The process as claimed in claim 1 wherein the radical Z or one of the radicals Z in the formula (1) is a β-sulfatoethylsulfonyl group.

4. The process as claimed in claim 1 wherein the dyestuff of the formula (1) is a dyestuff of the formula (5)

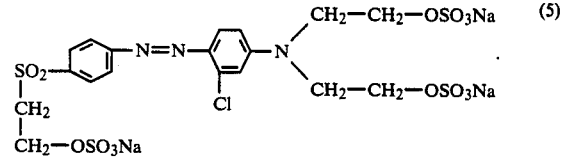

5. The process as claimed in claim 1 wherein the dyestuff of the formula (1) is a dyestuff of the formula (6)

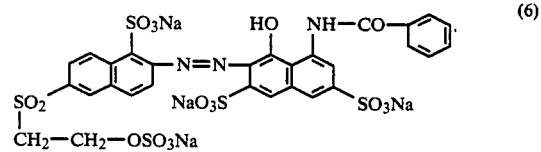

6. The process as claimed in claim 1 wherein the dyestuff of the formula (1) is a dyestuff of the formula (7)

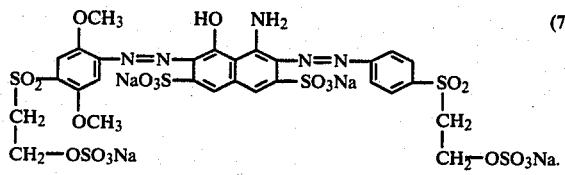

7. The process as claimed in claim 1 wherein the dyestuff of the formula (1) is a dyestuff of the formula (8)

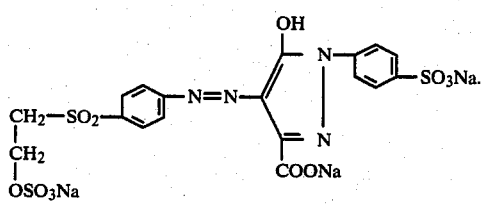

8. The process as claimed in claim 1 wherein the dyestuff of the formula (1) is a dyestuff of the formula (9)

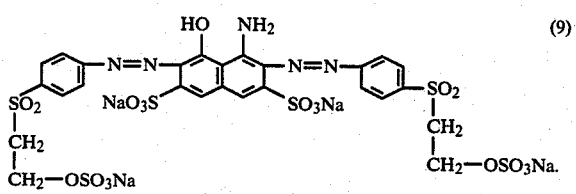

9. The process as claimed in claim 1 wherein the dyestuff of the formula (1) is a mixture of the dyestuffs of the formulae (10) and (11)

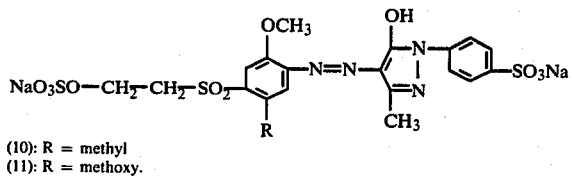

(10): R = methyl
(11): R = methoxy.

10. The process as claimed in claim 1 wherein the dyestuff of the formula (1) is a dyestuff of the formula (14)

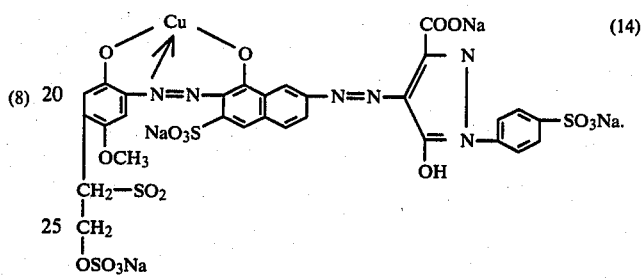

11. A dyestuff solution obtainable by a process according to claim 1, which contains in total 5 to 45% by weight of one or more of the dyestuffs of the general formula (1), less than 5% by weight of $Na_2SO_4$, 2% by weight or less than 2% by weight of chloride ions and optionally in total up to 3% by weight of one or more buffer substances and has a pH between 3 and 7.

12. A liquid aqueous dyeing composition according to claim 11, which contains less than 4% by weight of $Na_2SO_4$.

13. A liquid aqueous dyeing composition according to claim 11, which contains less than 1% by weight of chloride ions.

* * * * *

UNITED STATES PATENT AND TRADEMARK OFFICE
CERTIFICATE OF CORRECTION

PATENT NO. : 4,581,036

DATED : April 8, 1986

INVENTOR(S) : OPITZ ET AL

It is certified that error appears in the above-identified patent and that said Letters Patent is hereby corrected as shown below:

In column 2, line 57 and in column 22, line 34 (the fifth line of patent claim 1), structural formula "(1)" is not correctly drawn and should read -- 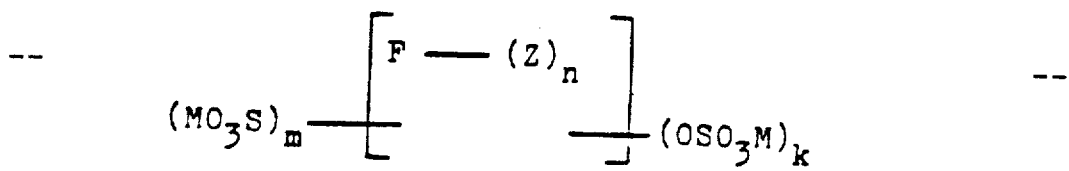 --

UNITED STATES PATENT AND TRADEMARK OFFICE
CERTIFICATE OF CORRECTION

PATENT NO. : 4,581,036
DATED : April 8, 1986
INVENTOR(S) : OPITZ ET AL

It is certified that error appears in the above-identified patent and that said Letters Patent is hereby corrected as shown below:

In column 20, first eleven lines, and in column 26, lines 16-26, the structural formula, formula "(14)" is not correctly drawn and should read

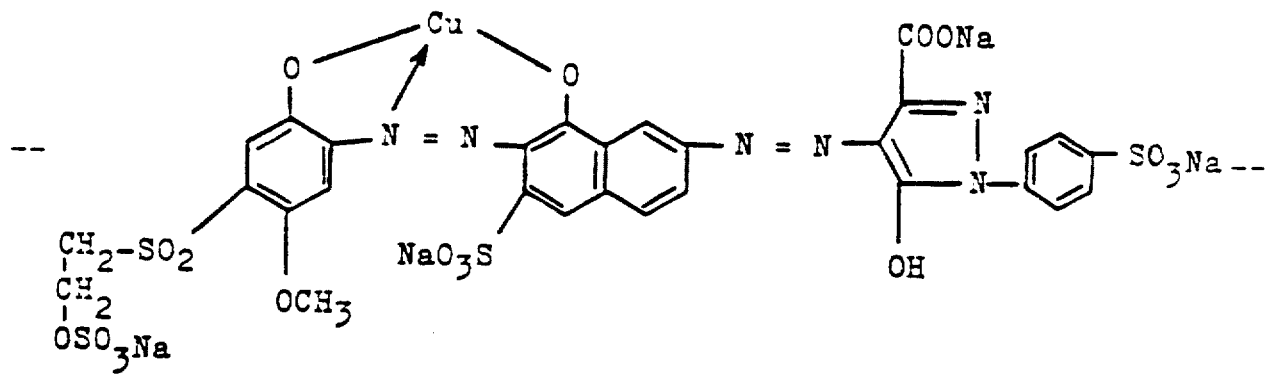

Signed and Sealed this

Twenty-sixth Day of August 1986

[SEAL]

Attest:

DONALD J. QUIGG

Attesting Officer

Commissioner of Patents and Trademarks